(12) United States Patent
Sakaguchi et al.

(10) Patent No.: US 10,513,162 B2
(45) Date of Patent: Dec. 24, 2019

(54) AIR CONDITIONER FOR VEHICLE

(71) Applicants: DENSO CORPORATION, Kariya, Aichi-pref. (JP); SUBARU CORPORATION, Shibuya-ku, Tokyo (JP)

(72) Inventors: Taisuke Sakaguchi, Kariya (JP); Shotaro Inoue, Tokyo (JP); Masaaki Okui, Tokyo (JP); Tsuyoshi Tanaka, Tokyo (JP)

(73) Assignees: DENSO CORPORATION, Kariya, Aichi-pref. (JP); SUBARU CORPORATION, Shibuya-ku, Tokyo (JP)

( * ) Notice: Subject to any disclaimer, the term of this patent is extended or adjusted under 35 U.S.C. 154(b) by 0 days.

(21) Appl. No.: 15/891,508

(22) Filed: Feb. 8, 2018

(65) Prior Publication Data

US 2018/0229578 A1 Aug. 16, 2018

(30) Foreign Application Priority Data

Feb. 15, 2017 (JP) .................................. 2017-25652

(51) Int. Cl.
*B60H 1/00* (2006.01)

(52) U.S. Cl.
CPC ....... *B60H 1/00028* (2013.01); *B60H 1/0005* (2013.01); *B60H 1/00207* (2013.01); *B60H 2001/00085* (2013.01); *B60H 2001/00092* (2013.01); *B60H 2001/00242* (2013.01)

(58) Field of Classification Search
CPC .. B60H 1/00028; B60H 1/0005; B60H 1/245; B60H 1/00207; B60H 2001/00085; B60H 2001/00092; B60H 2001/00242
See application file for complete search history.

(56) References Cited

U.S. PATENT DOCUMENTS

| 2007/0144724 A1* | 6/2007 | Shirota | B60H 1/00028 165/202 |
| 2009/0038774 A1 | 2/2009 | Ogiso et al. | |
| 2011/0162819 A1* | 7/2011 | Itou | B60H 1/00028 165/104.11 |

FOREIGN PATENT DOCUMENTS

JP 2009040304 A 2/2009

* cited by examiner

*Primary Examiner* — Jon T. Schermerhorn, Jr.
(74) *Attorney, Agent, or Firm* — Harness, Dickey & Pierce, P.L.C.

(57) ABSTRACT

An air conditioner for a vehicle has a housing. The housing defines an air passage therein, includes a suction port, and houses a blower fan. The blower fan draws an air from the suction port and discharges the air into the air passage. The housing includes a facing portion that faces an inlet defining member including an air inlet. The facing portion includes the suction port. The facing portion has a rib that protrudes from the facing portion toward the inlet defining member. The facing portion and the rib define at least a part of an air guiding passage that guides the air from the air inlet to the suction port.

8 Claims, 4 Drawing Sheets

AIR CONDITIONER FOR VEHICLE

CROSS REFERENCE TO RELATED APPLICATION

This application is based on and claims the benefit of priority from Japanese Patent Application No. 2017-025652 filed on Feb. 15, 2017. The entire disclosure of the application is incorporated herein by reference.

TECHNICAL FIELD

The present disclosure relates to an air conditioner for a vehicle.

BACKGROUND

An air conditioner for a vehicle is known to have a rear air conditioning unit that performs an air conditioning for a rear space inside a vehicle compartment (refer to JP 2009-040304 A). The rear air conditioning unit is positioned in a space defined between a rear trim, which is located in the rear space inside the vehicle compartment, and an exterior plate of the vehicle.

The rear air conditioning unit has a blower fan, an evaporator, and a heater core. The blower fan draws air from an inside of the vehicle compartment and blows the air toward the evaporator and the heater core. The evaporator cools the air flowing from the blower fan. The heater core heats the air that flows into the heater core after passing through the evaporator. Air, a temperature of which is adjusted by the evaporator and the heater core in the rear air conditioning unit, is blown into the vehicle compartment through a duct.

The above-described rear air conditioning unit has a housing. The housing generally defines an air passage therein and includes a suction port, i.e., an air inlet. Air flows into the air passage from the suction port.

A suction duct is attached to the housing of the rear air conditioning unit. The suction duct defines an air guiding passage therein. The air guiding passage connects the suction port of the rear air conditioning unit and a suction port of the rear trim. The suction duct guides the air to flow from the suction port of the rear trim to the suction port of the rear air conditioning unit.

Thus, air is introduced from the inside of the vehicle compartment to the suction port of the rear air conditioning unit through the suction port of the rear trim (i.e., an interior member) and the suction duct.

Here, the suction duct is provided separately from the housing of the rear air conditioning unit. Therefore, a quantity of components may increase and man-hours for assembling the components may increase.

SUMMARY

The present disclosure addresses at least one of the above issues. Thus, it is an objective of the present disclosure to provide an air conditioner for a vehicle, an air conditioning unit of which can have a simple structure. The air conditioning unit has an inlet defining member including an air inlet and draws air from the air inlet.

An air conditioner for a vehicle has a housing. The housing defines an air passage therein, includes a suction port, and houses a blower fan. The blower fan draws an air from the suction port and discharges the air into the air passage. The housing includes a facing portion that faces an inlet defining member including an air inlet. The facing portion includes the suction port. The facing portion has a rib that protrudes from the facing portion toward the inlet defining member. The facing portion and the rib define at least a part of an air guiding passage that guides the air from the air inlet to the suction port.

According to the above-described configuration, the housing includes the rib and defines the part of the air guiding passage by the rib. Therefore, a structure of an air conditioning unit, which draws air from the air inlet included in the inlet defining member, can be simplified.

BRIEF DESCRIPTION OF THE DRAWINGS

The above and other objects, features and advantages of the present disclosure will become more apparent from the following detailed description made with reference to the accompanying drawings.

DETAILED DESCRIPTION

Figure 1:
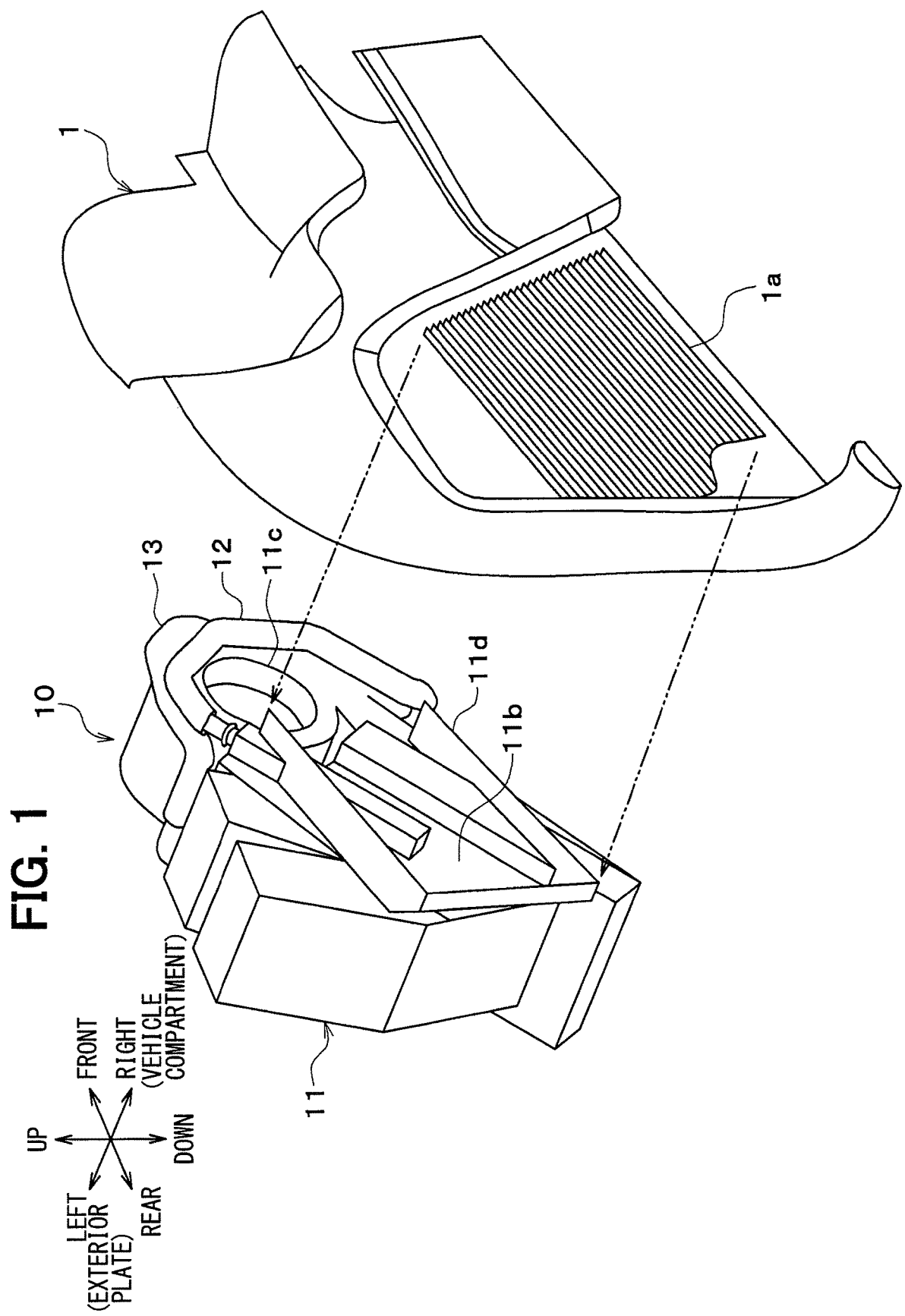
FIG. 1 is a perspective diagram illustrating a rear air conditioning unit and a lining member relating to a first embodiment.

An embodiment will be described hereafter referring to the drawings. An air conditioner for a vehicle has a rear air conditioning unit 10 shown in FIG. 1 to FIG. 4. The rear air conditioning unit performs an air conditioning for a rear space inside a vehicle compartment of the vehicle. The air conditioning is, for example, a heating operation and a cooling operation. Directions of up, down, front, rear, left, and right indicated by arrows in the drawings correspond to directions of up, down, front, rear, left, and right regarding the vehicle mounting the rear air conditioning unit 10.

The rear air conditioning unit 10 is located between a lining member 1 and an exterior plate 2 in a left rear part of the vehicle. The lining member 1 serves as an inner wall of the vehicle compartment. The exterior plate 2 serves as an outer wall of the vehicle. The exterior plate 2 is configured by an outer panel and an inner panel (not shown) that are applied to each other.

Figure 3:
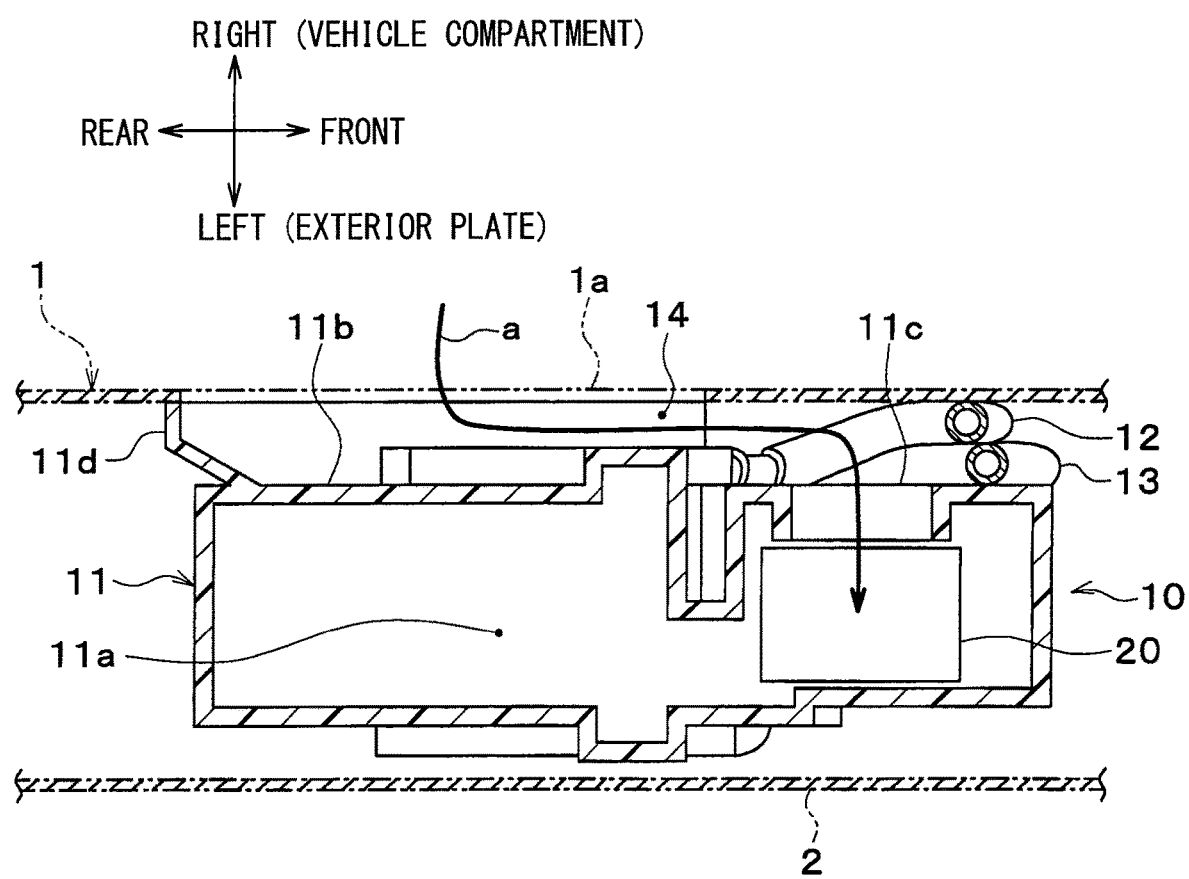
FIG. 3 is a cross-sectional view taken along a line III-III shown in FIG. 2.

Since the rear air conditioning unit 10 is located in the left rear part of the vehicle, the lining member 1 is located on a right side of the rear air conditioning unit 10 and the exterior plate 2 is located on a left side of the rear air conditioning unit 10. In other words, the rear air conditioning unit 10 is located between the lining member 1 and the exterior plate 2 in a lateral direction (i.e., a left-right direction) of the vehicle as shown in FIG. 3.

The rear air conditioning unit 10 has a housing 11. The housing 11 serves as an exterior wall of the rear air conditioning unit 10 and defines an air passage 11a therein. Air flows in the air passage 11a. The housing 11 is made of resin such as polypropylene that has certain elasticity and a great strength.

The housing 11 includes a facing portion 11b facing the lining member 1. The facing portion 11b includes a unit suction port 11c. The unit suction port 11c corresponds to a suction port of the present disclosure. The air in the vehicle compartment flows from the unit suction port 11c into the air passage 11a defined in the housing 11.

A blower fan 20, an evaporator 21, a heater core 22, and an air mix door (not shown) are arranged in the air passage 11a inside the housing 11.

The blower fan 20 draws the air from the vehicle compartment through the unit suction port 11c and discharges the air into the air passage 11a. A motor (not shown) operates the blower fan 20. The blower fan 20 and the motor configure an electric blower.

The evaporator 21 cools the air flowing from the blower fan 20 by performing a heat exchange between the air and a low-pressure refrigerant. The low-pressure refrigerant circulates in a refrigeration cycle (not shown). A refrigerant pipe (not shown) connects the evaporator 21 and the refrigeration cycle and delivers the low-pressure refrigerant from the refrigeration cycle to the evaporator 21.

The heater core 22 is a heat exchanger that heats air, which flows into the heater core 22 after being cooled in the evaporator 21, by performing a heat exchange between the air and an engine cooling water (i.e., a warm water). The engine cooling water is a heat medium that transfers an exhaust heat, which is generated in an engine (not shown), to the heater core 22.

The air mix door is an air volume adjuster that adjusts a ratio between a volume of air, which passes through the heater core 22 and is heated in the heater core 22, and a volume of air, which bypasses the heater core 22.

The air, which passes through the heater core 22 and is heated in the heater core 22, and the air, which bypasses the heater core 22, are mixed in the air passage 11a and become a conditioned air having a desired temperature. The conditioned air flows into the vehicle compartment through a duct (not shown).

The lining member 1 has a portion that faces the housing 11, and the portion includes a lining suction port 1a. The lining suction port 1a corresponds to an air inlet of the present disclosure. The lining suction port 1a guides the air from the inside of the vehicle compartment to the unit suction port 11c. The lining member 1 corresponds to an inlet defining member of the present disclosure and includes the lining suction port 1a. The lining suction port 1a is configured by slits, i.e., through-holes, passing through the lining member 1.

The housing 11 has a portion facing a rim of the lining suction port 1a and having a rib 11d. The rib 11d is formed integrally with the housing 11 to protrude from the housing 11 toward the rim of the lining suction port 1a.

A pipe is connected to the heater core 22 and delivers the engine cooling water to the heater core 22. The pipe has an inlet pipe 12 and an outlet pipe 13 positioned adjacent to a rim of the unit suction port 11c outside the housing 11. The inlet pipe 12 and the outlet pipe 13 are connected to the heater core 22 and deliver the engine cooling water to the heater core 22.

The inlet pipe 12 is a cooling water pipe that guides the engine cooling water to flow into the heater core 22. The outlet pipe 13 is a cooling water pipe that guides the engine cooling water to flow out of the heater core 22.

A gasket is attached to an outer periphery of the inlet pipe 12. Another gasket is attached to an outer periphery of the outlet pipe 13. The gaskets are thermal insulation members. The gaskets serve as sealing members that exert a sealing performance by being compressed by the lining member 1.

The inlet pipe 12 and the outlet pipe 13 are arranged adjacent to the rim of the unit suction port 11c included in the housing 11.

Figure 2:
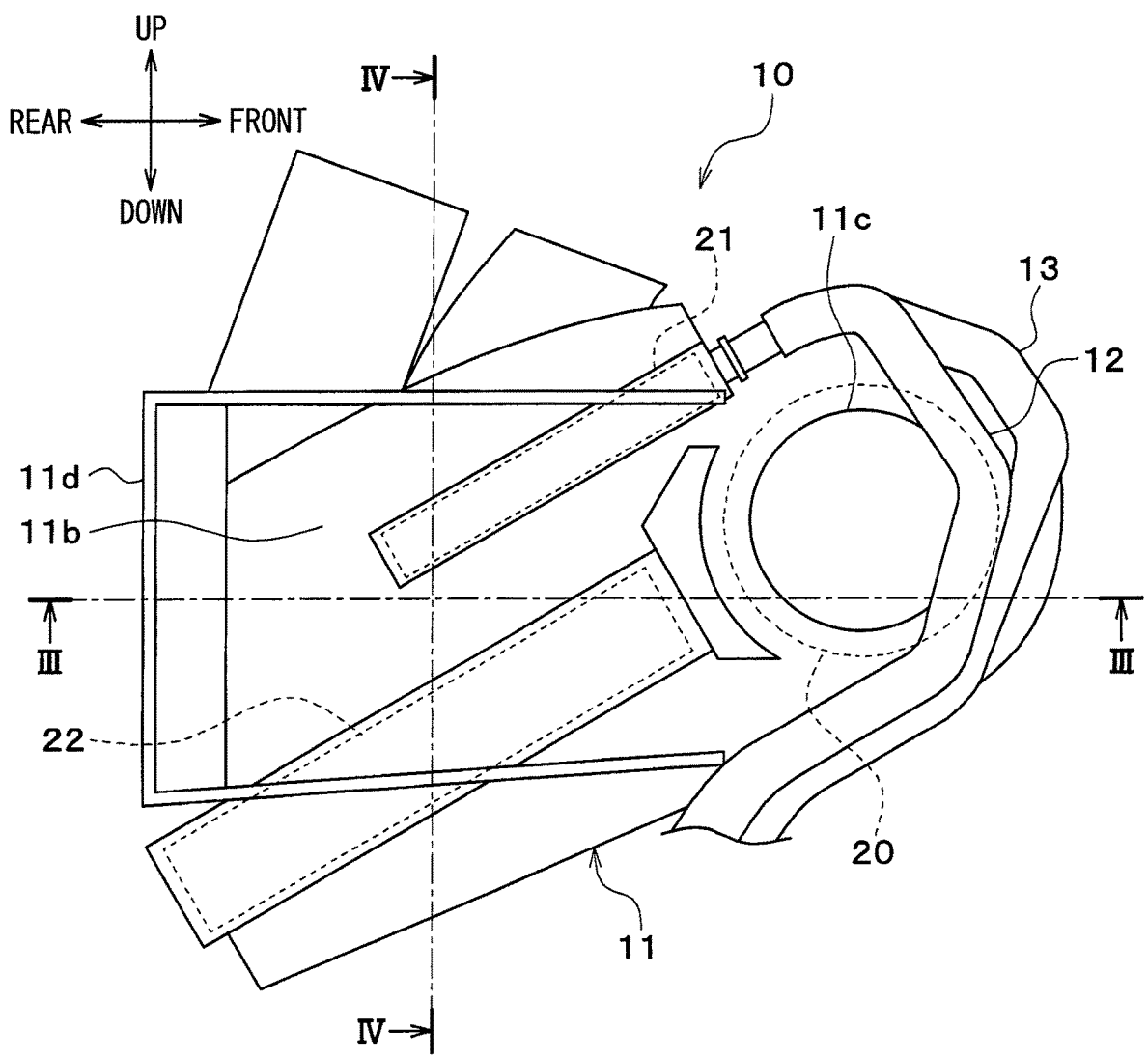
FIG. 2 is a front view illustrating the rear air conditioning unit relating to the first embodiment.

As shown in FIG. 1 and FIG. 2, the rib 11d, the inlet pipe 12, and the outlet pipe 13 surround the lining suction port 1a of the lining member 1 and the unit suction port 11c of the housing 11.

As shown in FIG. 3, the inlet pipe 12 and the outlet pipe 13 are stacked in this order in a direction away from the housing 11. That is, the outlet pipe 13 is located between the housing 11 and the inlet pipe 12 in the lateral direction.

The outlet pipe 13, which is located between the housing 11 and the inlet pipe 12, abuts on the housing 11 to suppress a void defined between the outlet pipe 13 and the housing 11.

In addition, the inlet pipe 12 and the outlet pipe 13 are in contact with each other at least partly to suppress a void defined between the inlet pipe 12 and the outlet pipe 13.

The lining member 1 has a portion facing the rib 11d, and a gasket is attached to the portion (not shown). The rib 11d abuts on the lining member 1 through the gasket. The gasket is a sealing member that exerts a sealing performance by being compressed between the rib 11d and the lining member 1.

Figure 4:
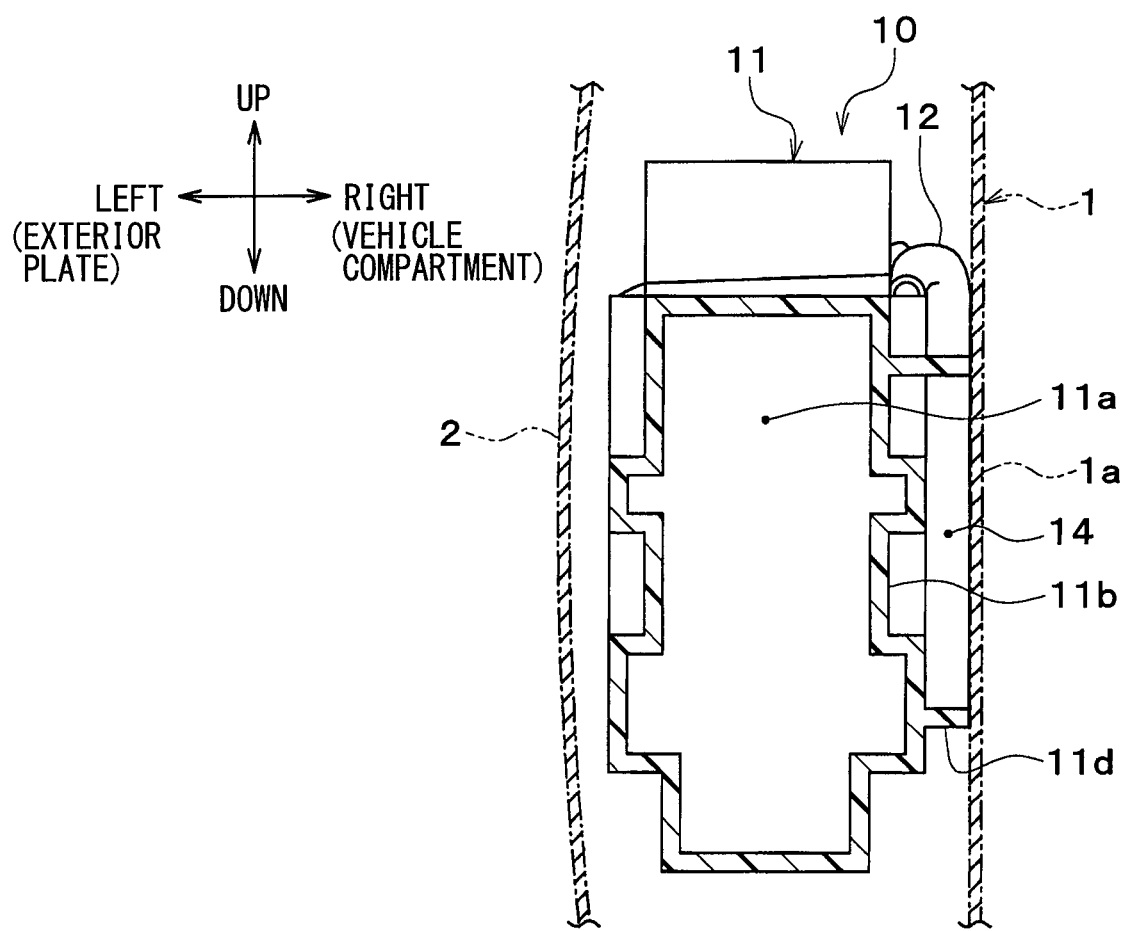
FIG. 4 is a cross-sectional view taken along a line IV-IV shown in FIG. 2.

As shown in FIG. 3 and FIG. 4, the rib 11d, the inlet pipe 12, the outlet pipe 13, and the lining member 1 define an air guiding passage 14. The air guiding passage 14 is a space serving as an air passage extending from the lining suction port 1a to the unit suction port 11c.

According to the above-described configuration, the air guiding passage 14 can be defined without using a suction duct that is disposed separately from the housing 11. Therefore, a quantity of components can be reduced, whereby man-hours for assembling the components can be reduced.

According to the present embodiment, the rib 11d and the facing portion 11b define at least a part of the air guiding passage 14 that guides the air from the lining suction port 1a of the lining member 1 to the unit suction port 11c of the housing 11.

Therefore, a structure of the rear air conditioning unit 10 can be simplified since the rib 11d provided with the housing 11 defines at least the part of the air guiding passage 14.

According to the present embodiment, the inlet pipe 12, the outlet pipe 13, and the facing portion 11b of the housing 11 define at least another part of the air guiding passage 14.

Therefore, the structure of the rear air conditioning unit 10 can be further simplified since at least the another part of the air guiding passage 14 can be defined by the inlet pipe 12 and the outlet pipe 13.

According to the present embodiment, the inlet pipe 12 and the outlet pipe 13 include portions that extend along at least a part of the rim of the unit suction port 11c. In other words, the inlet pipe 12 and the outlet pipe 13, at least partly, are arranged to extend along the rim of the unit suction port 11c.

Therefore, the air can be guided to the unit suction port 11c smoothly by the inlet pipe 12 and the outlet pipe 13. That is, the inlet pipe 12 and the outlet pipe 13 can serve as a bell mouth provided around the rim of the unit suction port 11c.

According to the present embodiment, a portion of the inlet pipe 12 and a portion of the outlet pipe 13 defining the another part of the air guiding passage 14 are in contact with each other. In other words, the inlet pipe 12 and the outlet pipe 13 have the portions that are in contact with each other and define the another part of the air guiding passage 14. Therefore, a void defined between the inlet pipe 12 and the outlet pipe 13 can be reduced. As a result, the another part of the air guiding passage 14 can be defined certainly.

According to the present embodiment, the rib 11d abuts on the lining member 1. Therefore, the part of the air guiding passage 14 can be certainly defined by the rib 11d.

According to the present embodiment, the housing 11 is located between the lining member 1 and the exterior plate 2 of the vehicle. Therefore, the structure of the rear air conditioning unit 10, which is disposed between the lining member 1 and the exterior plate 2, can be simplified since the rear air conditioning unit 10 can be located in a limited space between the lining member 1 and the exterior plate 2.

Modifications

For example, the above-described embodiment can be modified variously as follows.

(1) According to the above-described embodiment, the inlet pipe 12 and the outlet pipe 13 connected to the heater core 22 define a part of the air guiding passage 14. However, the air guiding passage 14 may be defined without using the inlet pipe 12 and the outlet pipe 13.

For example, the rib 11d is positioned adjacent to the rim of the unit suction port 11c instead of the inlet pipe 12 and the outlet pipe 13 such that the rib 11d defines the part of the air guiding passage 14.

(2) Alternatively, the refrigerant pipe connected to the evaporator 21 may be positioned adjacent to the rim of the unit suction port 11c instead of the inlet pipe 12 and the outlet pipe 13 such that the refrigerant pipe defines the part of the air guiding passage 14. The refrigerant pipe is a pipe that delivers the refrigerant, i.e., the heat medium, from the refrigeration cycle to the evaporator 21.

(3) According to the above-described embodiment, the rear air conditioning unit 10 is located in the left rear part of the vehicle. However, the rear air conditioning unit 10 may be located between a lining member and an exterior plate in a right rear part of the vehicle. Given this situation, the rear air conditioning unit 10, the lining member 1, and the exterior plate 2 are arranged with the right and left sides reversed. For example, the lining member 1 may be located on the left side of the rear air conditioning unit 10 and the exterior plate 2 may be located on the right side of the rear air conditioning unit 10.

(4) According to the above-described embodiment, the structure of the rear air conditioning unit 10, which is located between the lining member 1 and the exterior plate 2, is simplified. However, a structure of a host air conditioning unit can be simplified as well. Specifically, a structure of an air suction port of the host air conditioning unit, which is positioned inside an instrument panel in a front part of the vehicle, can be simplified as well.

The invention claimed is:

1. A vehicle air conditioning assembly including an air conditioner installed in a vehicle, the air conditioner comprising:
a housing, a blower fan and a heat exchanger; wherein
the housing defines an air passage therein and houses the blower fan and the heat exchanger,
the housing includes a suction port, the blower fan drawing an air from the suction port and discharging the air into the air passage,
the housing includes a facing portion that faces a lining member of the vehicle, the lining member including an air inlet and the facing portion includes the suction port,
the facing portion has a rib that protrudes from the facing portion toward the lining member,
the heat exchanger includes an inlet pipe to deliver a heat medium to the heat exchanger and an outlet pipe that guides the heat medium to flow out of the heat exchanger, the heat exchanger performs a heat exchange between the heat medium and the air, and
the air conditioner is attached to the lining member such that the facing portion, the lining member, the pipes and the rib together define an air guiding passage that guides the air from the air inlet to the suction port.

2. The assembly according to claim 1, wherein the outlet pipe has a portion that extends along at least a part of a rim of the suction port.

3. The assembly according to claim 1, wherein
the inlet pipe and the outlet pipe include portions that are in contact with each other.

4. The assembly according to claim 1, wherein the rib abuts the lining member.

5. The assembly according to claim 1, wherein
the housing is located between the lining member and an exterior plate of the vehicle.

6. The assembly according to claim 1, wherein
the air guiding passage is entirely defined by the rib, the facing portion, the lining member, the inlet pipe and the outlet pipe.

7. The assembly according to claim 6, wherein
the rib and the pipes together surround the air inlet and the suction port.

8. The assembly according to claim 1, wherein
the rib is formed integrally with the housing to protrude toward the lining member in a protruding direction, and
the facing portion and the air inlet oppose each other in the protruding direction and are separated by the air guiding passage.

* * * * *